US008181547B2

(12) United States Patent
Tsuji et al.

(10) Patent No.: US 8,181,547 B2
(45) Date of Patent: May 22, 2012

(54) SPEED CHANGE DEVICE FOR TRAVELING VEHICLE

(75) Inventors: Kenichiro Tsuji, Ashiya (JP); Tetsuya Yamamoto, Sakai (JP); Yoshihiro Mitobe, Sakai (JP)

(73) Assignee: Kubota Corporation, Osaka (JP)

( * ) Notice: Subject to any disclaimer, the term of this patent is extended or adjusted under 35 U.S.C. 154(b) by 924 days.

(21) Appl. No.: 12/208,173

(22) Filed: Sep. 10, 2008

(65) Prior Publication Data

US 2009/0100952 A1 Apr. 23, 2009

(30) Foreign Application Priority Data

Oct. 18, 2007 (JP) ................................ 2007-270956

(51) Int. Cl.
*F16H 59/00* (2006.01)
*F16H 63/00* (2006.01)

(52) U.S. Cl. ........................................ 74/335; 74/331

(58) Field of Classification Search .................... 74/329, 74/330, 331, 335, 15.6, 15.63, 15.66, 665 F, 74/665 G
See application file for complete search history.

(56) References Cited

U.S. PATENT DOCUMENTS 4,208,923 A * 6/1980 Ikegami ....................... 74/15.63
4,292,866 A * 10/1981 Kaczynski ...................... 82/158
4,498,356 A * 2/1985 Vater et al. ....................... 74/745
4,628,768 A * 12/1986 Omura et al. ................... 74/745
4,637,269 A * 1/1987 Hasegawa et al. .............. 74/335
4,721,002 A * 1/1988 Horii .............................. 74/329
5,901,606 A * 5/1999 Umemoto et al. ........... 74/15.66
6,003,391 A * 12/1999 Kojima et al. ............... 74/15.66

FOREIGN PATENT DOCUMENTS

JP 52-78222 U1 6/1977
JP 57-165840 U1 10/1982
JP 2-212225 A 8/1990
JP 2006-90477 A 4/2006
JP 2007145217 A 6/2007

* cited by examiner

*Primary Examiner* — David D Le
*Assistant Examiner* — Jude Agendia
(74) *Attorney, Agent, or Firm* — The Webb Law Firm

(57) ABSTRACT

A speed change device for a traveling vehicle comprising:
- a thrust shaft connected to an engine;
- a speed change mechanism for changing between a high and a low speed provided to the thrust shaft;
- a counter shaft for transmitting an output from the speed change mechanism for changing between a high and a low speed;
- a mechanism for switching between advancing and retracting provided to the counter shaft, the mechanism having a forward-rotation idler gear rotatably supported on the thrust shaft;
- a speed change shaft for transmitting reverse-rotation power from the counter shaft as forward-rotation power via the forward-rotation idler gear;
- a driven shaft provided as an extension to the thrust shaft; and
- a main speed-change mechanism having a driving gear group provided to the speed change shaft and a driven gear group provided to the driven shaft.

7 Claims, 4 Drawing Sheets

SPEED CHANGE DEVICE FOR TRAVELING VEHICLE

BACKGROUND OF THE INVENTION

1. Field of the Invention

The present invention relates to a speed change device for a tractor or another traveling vehicle.

2. Description of the Related Art

A traveling-type auxiliary speed change device disposed between an engine and a synchronous multi-speed speed change device exists in the associated prior art, as disclosed in the Japanese Laid-open Patent Publication No. 2007-145217. The device has a mechanism for switching between a high and a low speed and a mechanism for switching between forward and backward rotation, which are disposed in the stated order from the upstream side to the downstream side with respect to the direction of power transmission. The mechanism for switching between forward and backward rotation is configured so that a state in which traveling power is transmitted along a path from an engine to drive wheels becomes a state of disconnected power in association with a disconnecting operation of a clutch operation member that performs an engaging or disengaging operation.

In the mechanism for switching between forward and backward rotation, a driving force is converted into forward-rotation power via an idler gear supported on an idler shaft, and a composite multi-speed speed change device (a secondary speed change device or a super speed reduction device) is aligned in series rearward of the synchronous multi-speed speed change device.

SUMMARY OF THE INVENTION

According to the prior art, an idler shaft as well as a shaft bearing that supports the idler shaft have been required merely for a single idler gear to be provided, and costs are correspondingly higher.

It is an object of the present invention to provide a speed change device for a traveling vehicle that makes it possible to resolve the above problems of the prior art.

The characterizing aspects of a traveling vehicle according to the present invention are enumerated below.

A speed change device for a traveling vehicle comprising:

a thrust shaft connected to an engine;

a speed change mechanism for changing between a high and a low speed provided to the thrust shaft;

a counter shaft for transmitting an output from the speed change mechanism for changing between a high and a low speed;

a mechanism for switching between advancing and retracting provided to the counter shaft, the mechanism having a forward-rotation idler gear rotatably supported on the thrust shaft;

a speed change shaft for transmitting reverse-rotation power from the counter shaft as forward-rotation power via the forward-rotation idler gear;

a driven shaft provided as an extension to the thrust shaft; and a main speed-change mechanism having a driving gear group provided to the speed change shaft and a driven gear group provided to the driven shaft.

Further, the invention according to the above aspect preferably further comprises a transmission casing for accommodating the mechanism for switching between advancing and retracting, wherein the forward-rotation idler gear is supported by a partition wall of the transmission casing via a first bearing, and a rear end of the thrust shaft is supported by the forward-rotation idler gear via a second bearing.

Further, according to the invention of the above aspect, it is preferable for the speed change mechanism for changing between a high and a low speed to be of a hydraulically switching format; and for a first oil channel for supplying compression oil to the speed change mechanism for changing between a high and a low speed to be formed in an interior of the thrust shaft.

Further, according to the invention of the above aspect, it is preferable for the mechanism for switching between advancing and retracting to be of a hydraulically switching format; and for a second oil channel for supplying compression oil to the mechanism for switching between advancing and retracting to be formed in an interior of the counter shaft.

Further, the invention according to the above aspect preferably further comprises a mechanism casing for accommodating the speed change mechanism for changing between a high and a low speed; and for supporting a front portion of the thrust shaft and a front portion of the counter shaft.

Further, according to the invention of the above aspect, it is preferable for a lubrication oil channel to be formed passing through the interior of the mechanism casing from the interior of the thrust shaft to the interior of the counter shaft.

Further, the invention according to the above aspect preferably further comprises a secondary speed change shaft disposed parallel to the driven shaft and rearward of the counter shaft; and a gear group of a secondary speed change mechanism provided to the secondary speed change shaft and the driven shaft.

According to the aforementioned configuration, the drive force from the engine is transmitted from the thrust shaft to the counter shaft via the speed change mechanism for changing between a high and a low speed, from the counter shaft to the speed change shaft via the mechanism for switching between advancing and retracting on the counter shaft, and from a driving gear group of a main speed change mechanism provided on the speed change shaft to a main speed change driven gear group on a driven shaft provided as an extension of the thrust shaft, when a gear has been selected.

Since a reverse-rotation force is transmitted from the thrust shaft to the counter shaft, the power from the counter shaft to the speed change shaft will also be reversed rotation; therefore, a forward-rotation idler gear for converting the rotation of the counter shaft to forward rotation and transmitting the forward rotation to the speed change shaft is provided. Having the forward-rotation idler gear rotatably supported on the thrust shaft makes it possible to dispense with the specific-purpose idler shaft.

Having the forward-rotation idler gear supported via a first bearing by the partition wall of the transmission casing for accommodating the mechanism for switching between advancing and retracting, and having the rear end of the thrust shaft supported via a second bearing makes it possible to simplify the supporting of the rear end of the thrust shaft and provide a more compact configuration in the axial direction.

Operating oil and lubrication oil can be supplied to the speed change mechanism for changing between a high and a low speed and the mechanism for switching between advancing and retracting via the mechanism casing. This is accomplished by adopting a hydraulically switching format for the speed change mechanism for changing between a high and a low speed and the mechanism for switching between advancing and retracting; removably providing the mechanism casing for supporting each of the front portions of the thrust shaft and the counter shaft; providing the first oil channel, via which compression oil is supplied to the speed change mechanism for changing between a high and a low speed, to the interior of the mechanism casing and the thrust shaft; providing the second oil channel, via which compression oil is supplied to the mechanism for switching between advancing and retracting, to the interior of the mechanism casing and the counter shaft; and providing a lubrication oil channel that originates from the interior of the thrust shaft, passes through the mechanism casing, and reaches to the interior of the counter shaft.

Having a secondary speed change shaft that is parallel to the driven shaft be disposed rearward of the counter shaft, and having the gear group of the secondary speed change mechanism be provided to the secondary speed change shaft and the driven shaft makes it possible for the secondary speed change mechanism to also be disposed within the range of a space in the axial direction where the main speed change mechanism is disposed, and for the speed change device to given a more compact configuration in the longitudinal direction.

DESCRIPTION OF THE PREFERRED EMBODIMENTS

Figure 1:
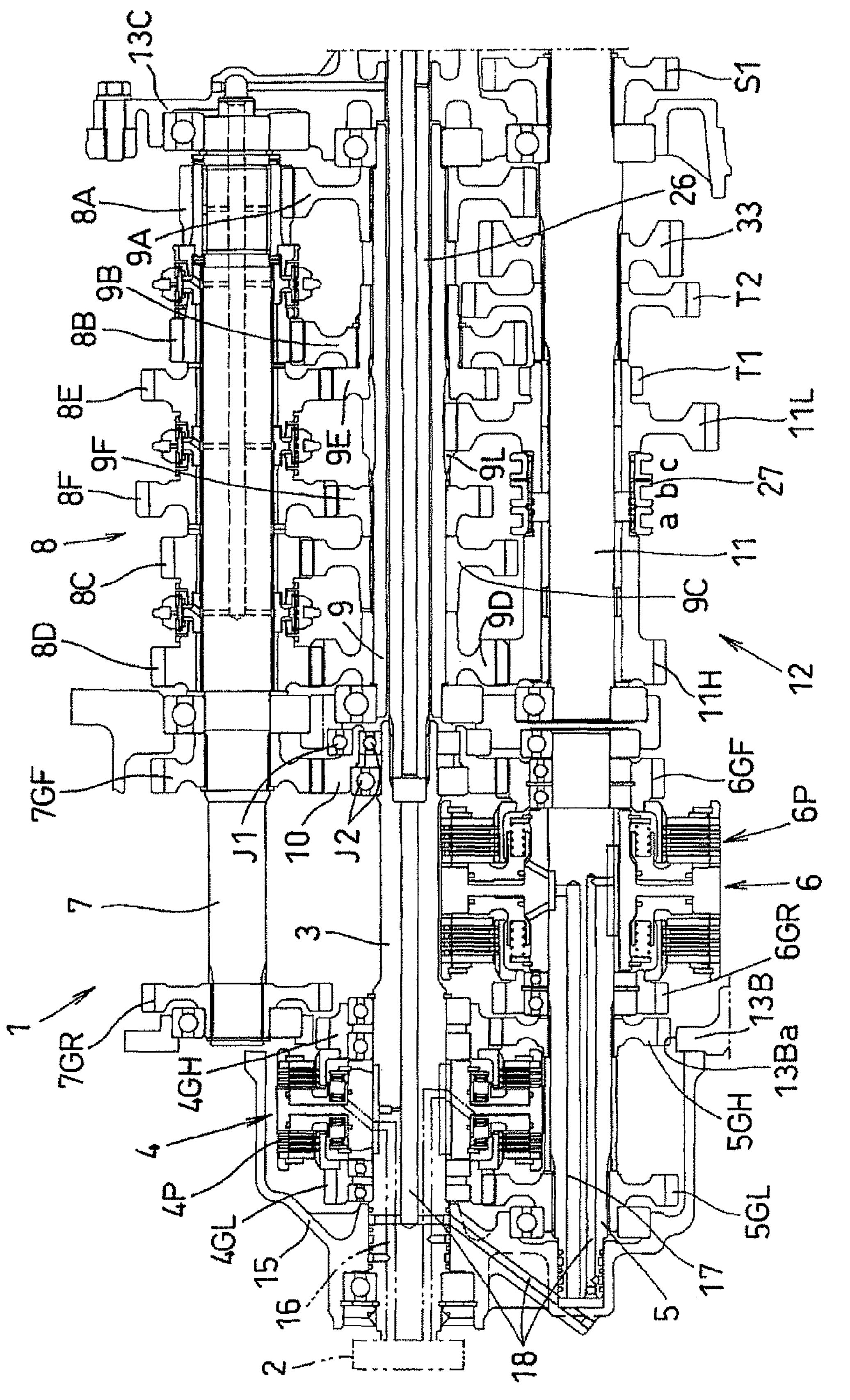
FIG. 1 is a cross-sectional side view of a main section of a speed change device showing an embodiment of the present invention.

Embodiments of the present invention will be described below based on the accompanying drawings.

As shown in FIGS. 1 to 4, reference symbol 1 represents a speed change device (transmission) for a tractor, which is used as an example of a traveling vehicle. The speed change device for the tractor is provided with a speed change mechanism 4 for changing between a high and a low speed; a mechanism 6 for switching between advancing and retracting; a six-speed main speed change mechanism 8; and a secondary speed change mechanism 12. The speed change device for the tractor is capable of switching between twenty-four speeds for forward and backward movement, a super speed reduction mechanism 21 is optionally attached to the secondary speed change mechanism 12, and a front wheel power transmitting mechanism 22 is capable of switching between constant-speed and multiple-speed modes.

The speed change mechanism 4 for changing between a high and a low speed, which is of a hydraulically switching format, is provided on a thrust shaft 3 connected to an engine 2. The mechanism 6 for switching between advancing and retracting is provided to a counter shaft 5 via which an output is transmitted from the speed change mechanism 4 for changing between a high and a low speed. A driving gear group of the main speed change mechanism 8 is provided to a speed change shaft 7 via which an output is transmitted from the mechanism 6 for switching between advancing and retracting. A driven shaft 9, to which a driven gear group of the main speed change mechanism 8 is provided, is disposed as an extension of the thrust shaft 3.

A secondary speed change shaft 11 that is parallel to the driven shaft 9 is disposed rearward of the counter shaft 5. A gear group of the secondary speed change mechanism 12 is provided to the secondary speed change shaft 11 and the driven shaft 9. A super speed reduction interlocking gear group of the super speed reduction mechanism 21, which is supported by a cassette supporting unit 29, engages with a super speed reduction gear group, which is provided to the secondary speed change shaft 11.

Figure 2:
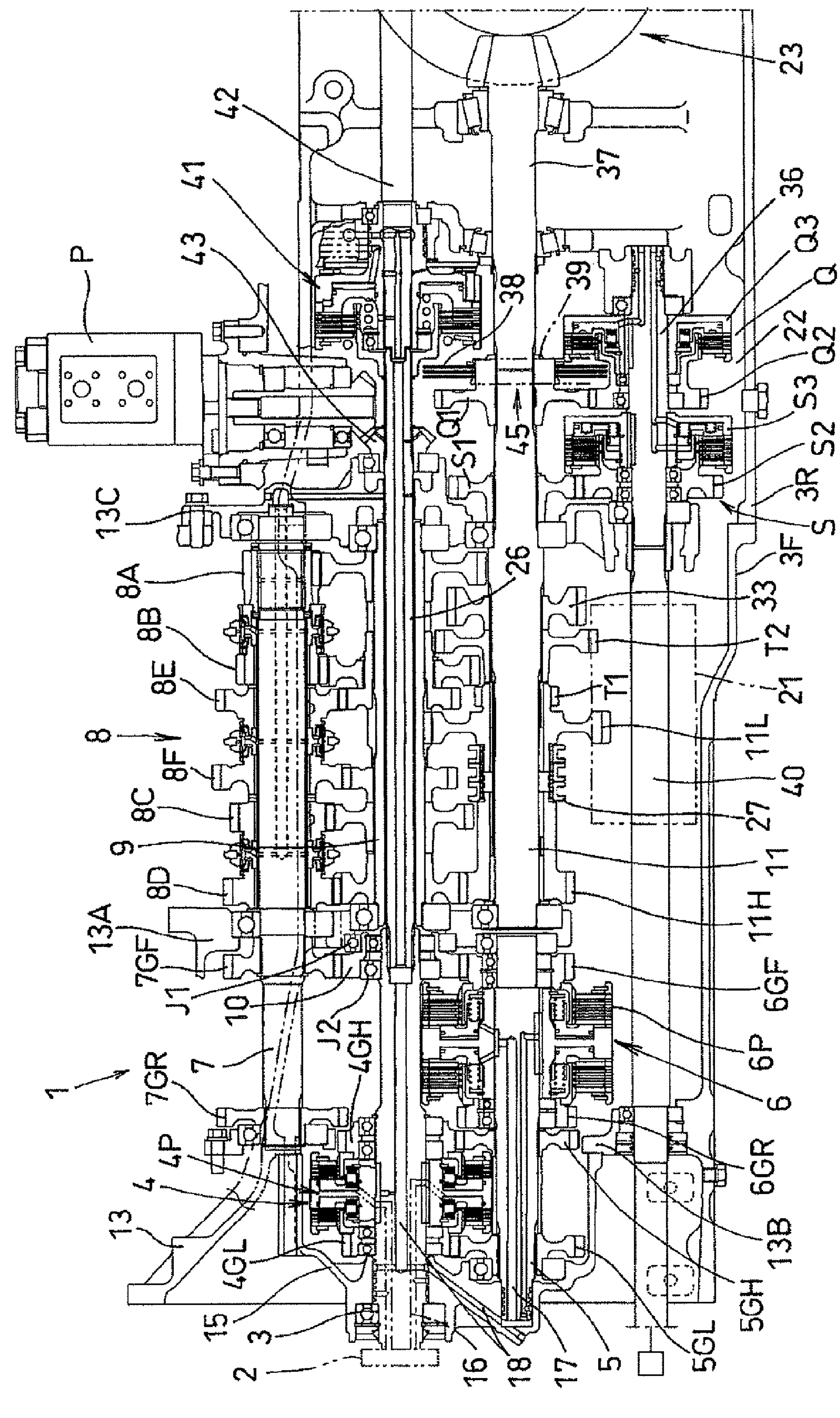
FIG. 2 is a cross-sectional side view of the entirety of the speed change device.

As shown in FIGS. 1 and 2, a transmission casing 13 is divided into two parts along a longitudinal direction. A front transmission casing 3F accommodates the speed change mechanism 4 for changing between a high and a low speed up to a rear part of the main speed change mechanism 8, and a rear transmission casing 3R accommodates the front wheel power transmitting mechanism 22 up to a rear wheel differential mechanism 23 as well as a PTO speed change mechanism (not shown).

The front transmission casing 3F is provided with a middle partition wall 13A and a front partition wall 13B; and a mechanism casing 15 is fastened with bolts to a front surface of the front partition wall 13B, enclosing the speed change mechanism 4 for changing between a high and a low speed.

The thrust shaft 3, which is connected to the engine 2 via a flywheel and buffering means, and the counter shaft 5, via which a high and low force is transmitted from the thrust shaft 3, are supported on a front part by the mechanism casing 15, and are supported on a rear part by the middle partition wall 13A.

The thrust shaft 3 has a high-speed gear 4GH and a low-speed gear 4GL for the speed change mechanism 4 for changing between a high and a low speed, and a clutch pack 4P for a high and a low speed, the clutch pack 4P alternatingly interlockingly connecting the high-speed gear 4GH and the low-speed gear 4GL to the thrust shaft 3. A high-speed driven gear 5GH that meshes with the high-speed gear 4GH, and a low-speed driven gear 5GL that meshes with the low-speed gear 4GL are spline-fitted onto the counter shaft 5. It is possible to select between a high-speed mode, in which the high-speed gear 4GH is used to cause the counter shaft 5 to rotate with the thrust shaft 3 at a constant speed, and a low speed mode in which the low-speed gear 4GL is used to cause the counter shaft 5 to rotate at a lower speed than the thrust shaft 3.

On the latter half of the counter shaft 5 is provided a forward-rotation gear 6SF and a reverse-rotation gear 6GR of the mechanism 6 for switching between advancing and retracting, and a clutch pack 6P for advancing and retracting for interlockingly connecting the forward-rotation gear 6GF and the reverse-rotation gear 6GR to the counter shaft 5 in an alternating manner. A forward-rotation driven gear 7GF that meshes with the forward-rotation gear 6GF via the forward-rotation idler gear 10, and a reverse-rotation driven gear 7GR that meshes directly with the reverse-rotation gear 6GR are spline-fitted to the speed change shaft 7, which is disposed parallel to the thrust shaft 3 and the counter shaft 5. It is possible to select between a forward-rotation mode, in which the forward-rotation gear 6GF and the forward-rotation idler gear 10 are used to cause the speed change shaft 7 to rotate in the same direction as the counter shaft 5, and a reverse-rotation mode in which the reverse-rotation gear 6GR is used to cause the speed change shaft 7 to rotate in the opposite direction of the counter shaft 5.

The forward-rotation idler gear 10 is fitted to the thrust shaft 3 via a bearing J2 and is rotatably supported by the middle partition wall 13A via a bearing J1. The forward-rotation idler gear 10 supports the rear half of the thrust shaft 3, the thrust shaft 3 also serves as the idle shaft of the forward-rotation idler gear 10, and both the thrust shaft 3 and the forward-rotation idler gear 10 are supported by the middle partition wall 13A.

The front partition wall 13B supports a front end of the speed change shaft 7, but has a large opening 13Ba formed therein and is formed in a shape such that the middle region of the thrust shaft 3 and the counter shaft 5 are not supported. The space between the front partition wall 13B and the middle partition wall 13A is in communication via the inside of the mechanism casing 15 and the opening 13Ba.

Due to the middle region of the thrust shaft 3 and the counter shaft 5 not being supported, the high-speed gear 4GH and the high-speed driven gear 5GH can be disposed in proximity to the reverse-rotation gear 6GR and the reverse-rotation driven gear 7GR in the axial direction, and the speed change device 1 can be made more compact.

Figure 3:
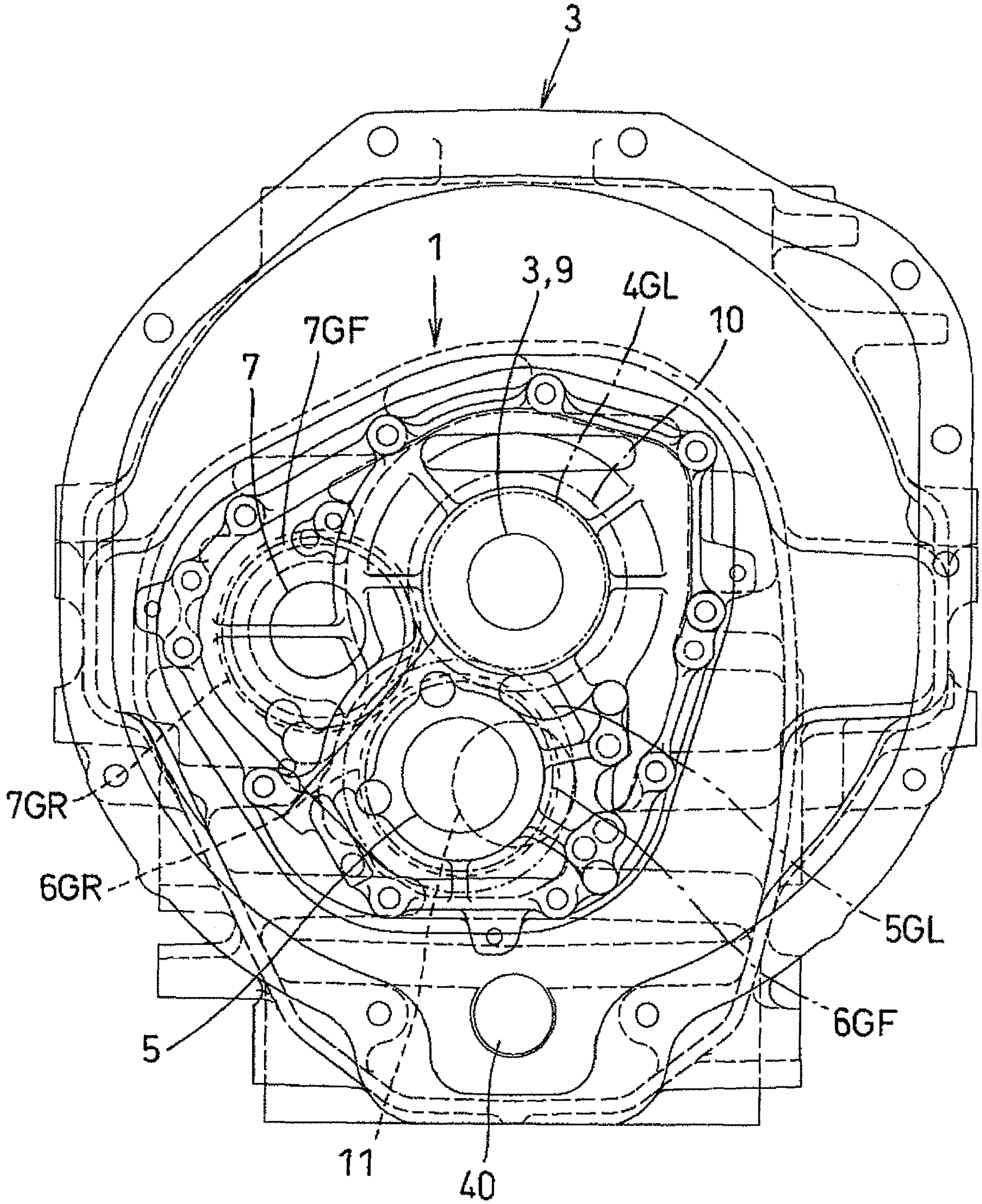
FIG. 3 is a front view of the speed change device.
Figure 4:
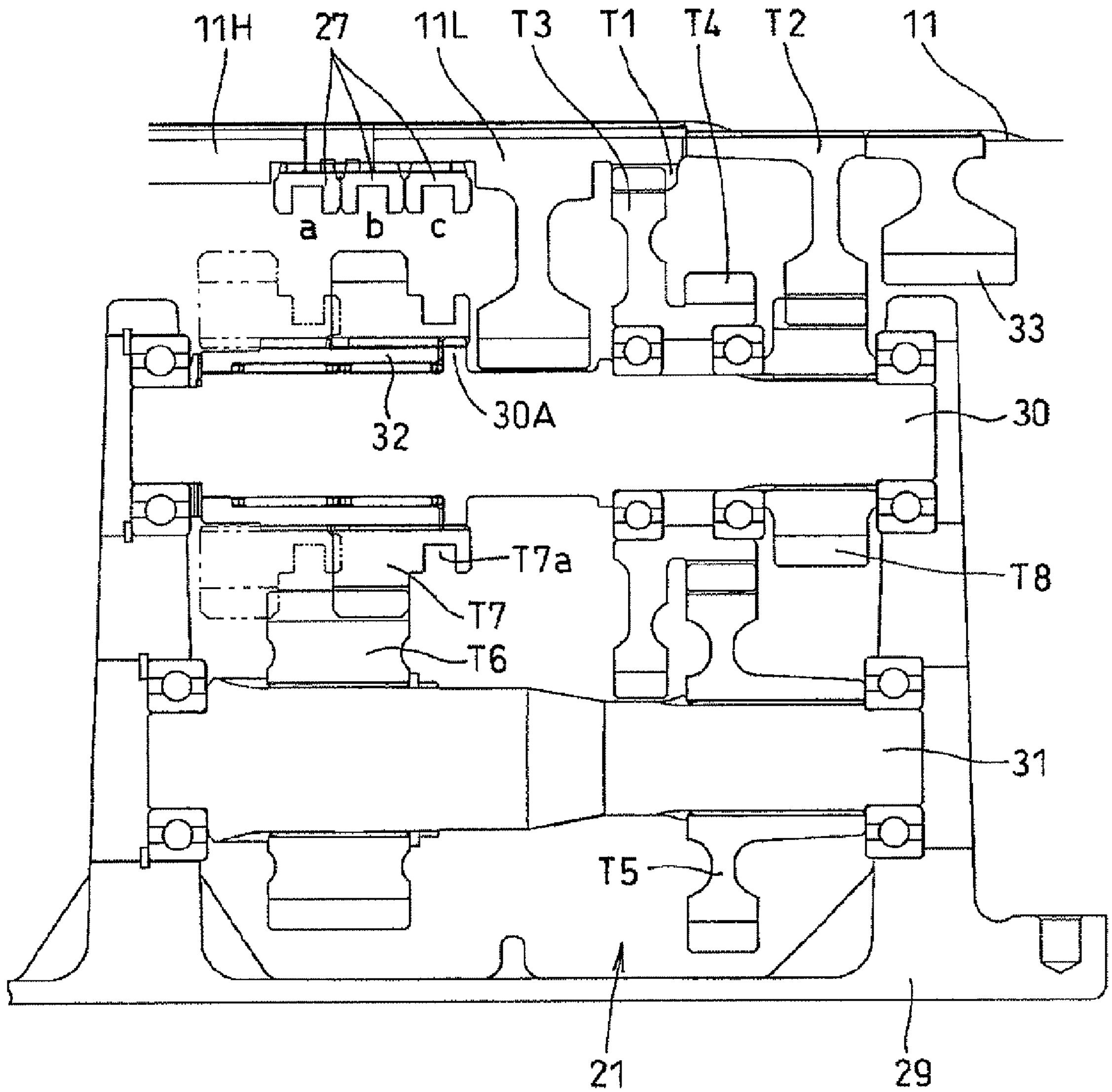
FIG. 4 is a cross-sectional side view showing a super speed reduction mechanism.

As shown in FIG. 3, the thrust shaft 3, the counter shaft 5, and the speed change shaft 7 are triangularly disposed when viewed from the front. The forward-rotation idler gear 10 simultaneously meshes with the forward-rotation gear 6GF and the forward-rotation driven gear 7GF, converts the rotation of the counter shaft 5 into a forward rotation, and transmits the rotation to the speed change shaft 7. The reverse-rotation gear 6GR directly meshes with the reverse-rotation driven gear 7GR and transmits the reverse-rotation force to the speed change shaft 7.

The mechanism 6 for switching between advancing and retracting serves as a main clutch for the speed change device 1, and when the mechanism 6 for switching between advancing and retracting is in a neutral state, the main speed change mechanism 8 is not subjected to the inertial force of the front speed change mechanism 4 for changing between a high and a low speed; therefore, the speed changing operation of the main speed change mechanism 8 can be performed smoothly and straightforwardly. Since the mechanism 6 for switching between advancing and retracting is located at a low position within the transmission casing 13 and is immersed in transmission oil, an adequate amount of lubrication can be provided thereto.

Provided within the thrust shaft 3 is a first oil channel 16 for supplying compression oil to the clutch pack 4P for a high and a low speed of the speed change mechanism 4 for changing between a high and a low speed, and provided within the counter shaft 5 is a second oil channel 17 for supplying compression oil to the clutch pack 6P for advancing and retracting of the mechanism 6 for switching between advancing and retracting.

Since the mechanism casing 15 supports the front part of the thrust shaft 3 and the counter shaft 5, piping is simple to install. Supplying the operating oil from an external hydraulic pump to the mechanism casing 15 via a control valve enables control over supplying operating oil to the clutch pack 4P, 6P to be performed straightforwardly and reliably.

A lubrication oil channel is formed within the thrust shaft 3 and the counter shaft 5; however, an oil channel via which the lubrication oil channels of both shafts communicates is formed in the mechanism casing 15, and a series of lubrication oil channels 18 is formed. The lubrication oil passes through the thrust shaft 3 and reaches the mechanism casing 15, and can further be supplied to the inside of the counter shaft 5 from the mechanism casing 15.

The middle portion of the speed change shaft 7 is supported by the middle partition wall 13A, and the rear end is supported by a rear partition wall 13C. The rear partition wall 13C can be formed on the front transmission casing 3F, but is normally formed on the front end of the rear transmission casing 3R, and also supports the rear end of the driven shaft 9 and the rear part of the secondary speed change shaft 11.

A group of driving gears 8A through 8F of the main speed change mechanism 8 is provided to the speed change shaft 7.

The main speed change mechanism 8 is a six-speed mechanical "synchromesh" (synchronized meshing) mechanism; and shift forks are disposed, respectively, in a space between the first gear 8A and the second gear 8B, in a space between the third gear 8C and the fourth gear 8D, and in a space between the fifth gear 8E and the sixth gear 8F. The three shift forks are moved in an alternating fashion, so that a single gear will interlockingly connect to the speed change shaft 7.

Each of the driving gears 8A through 8F of the main speed change mechanism 8 meshes respectively with a driven gear 9A through 9F located on the driven shaft 9. The driven shaft 9, which is hollow, is supported by the middle partition wall 13A and the rear partition wall 13C on the front and rear end, is concentrically disposed as an extension of the thrust shaft 3, and has a PTO driving shaft 26 passing through the interior thereof.

The secondary speed change shaft 11 that is parallel to the driven shaft 9 is disposed rearward of the counter shaft 5. The gear group of the secondary speed change mechanism 12 is provided to the secondary speed change shaft 11 and the driven shaft 9.

In the secondary speed change mechanism 12, the driven gear 9D is also used as a high-speed gear on the driving side, and a low-speed gear 9L is formed on the driven shaft 9. A high-speed secondary gear 11H, which is constantly enmeshed with the driven gear 9D, and a low-speed secondary gear lit, which is constantly enmeshed with the low-speed gear 9L, are unrestrictedly fitted to the secondary speed change shaft 11; and are capable of being interlockingly connected in an alternating manner to the secondary speed change shaft 11 by a secondary speed change shifter 27.

The secondary speed change shifter 27 not only has a secondary high-speed mode a for connecting the high-speed secondary gear 11H to the secondary speed change shaft 11, and a secondary low-speed mode b for connecting the low-speed secondary gear 11L to the secondary speed change shaft 11, but an additional mode c, in which the secondary speed change shifter 27 is positioned on the low-speed secondary gear 11L, and neither the high-speed secondary gear 11H nor the low-speed secondary gear 11L is able to connect to the secondary speed change shaft 11. The mode c is used during a super speed reduction mode enacted by the super speed reduction mechanism 21.

The super speed reduction mechanism 21 is composed of a group of super speed reduction input and output gears T1, T2 provided to the secondary speed change shaft 11, with which a group of interlocking super speed reduction gears T3 through T8 mesh. The gears T3 to T8 are associated with the super speed reduction mechanism 21 and are supported by the cassette supporting unit 29.

The super speed reduction input gear T1 provided to the secondary speed change shaft 11 is a gear that transmits power to the super speed reduction mechanism 21, and is integrally formed with the low-speed secondary gear 11L of the secondary speed change mechanism 12. The output gear T2 is a gear via which power is returned from the super speed reduction mechanism 21 to the secondary speed change shaft 11, and is spline-fitted to the secondary speed change shaft 11.

A rotating shaft 30 and a transmission shaft 31 parallel to the secondary speed change shaft 11 are supported by the cassette supporting unit 29. Interlocking gears T3, T4, T7, T8 are provided to the rotating shaft 30, and interlocking gears T5, T6 are provided to the transmission shaft 31.

The interlocking gears T3, T4 are formed as a single unit, and are supported by the rotating shaft 30 via shaft bearing. The interlocking gear T3 meshes with the input gear T1; the interlocking gear T4 meshes with the interlocking gear T5, which is secured to the transmission shaft 31; and the interlocking gear T6, which is similarly secured to the transmission shaft 31, meshes with the interlocking gear T7 on the rotating shaft 30.

The interlocking gear T7 is a shift gear having a shifter engaging portion T7*a*, and is slidably spline-fitted in the axial direction around the outer periphery of a rotation-supporting unit 32 fitted to the rotating shaft 30 via a needle shaft bearing. The interlocking gear T7 can mesh with a meshing portion 30A that is provided to the rotating shaft 30 so as to protrude radially outward.

The interlocking gear T7 can be moved into three positions in association with the secondary speed change shifter 27. When the secondary speed change shifter 27 is in a position in which the secondary high-speed mode a and the secondary low-speed mode b are taken, the interlocking gear T7 only meshes with the rotation support 32. When the interlocking gear T7 simultaneously meshes with the rotation support 32 and the meshing portion 30A, the secondary speed change shifter 27 only meshes with the low-speed secondary gear 11L, and enters a mode c wherein neither the high-speed secondary gear 11H nor the low-speed secondary gear 11L can interlock with the secondary speed change shaft 11.

Therefore, when the interlocking gear T7 is simultaneously caused to mesh with the rotation support 32 and the meshing portion 30A, the rotation force of the low-speed secondary gear 11L is transmitted from the input gear T1 to the transmission shaft 31 via the interlocking gears T3, T4, T5; from the transmission shaft 31 to the rotating shaft 30 via the interlocking gears T6, T7 and the meshing portion 30A; and, four speeds lower, to the secondary speed change shaft 11 via the interlocking gear T8 on the rotating shaft 30, and the output gear T2.

The super speed reduction mechanism 21 is optionally attached; when the super speed reduction mechanism 21 is not attached, the cassette supporting unit 29 is removed, the secondary speed change shifter 27 may be restricted so as not to move into the position of mode c, and the input/output gears T1, T2 are left in an unused state. Furthermore, a gear 33 on the secondary speed change shaft 11 is provided in order to constitute a parking brake.

In the rear transmission casing 3R, the front wheel power transmitting mechanism 22 is provided between a rear part of the secondary speed change shaft 11 and a front wheel power output shaft 36 that is disposed in parallel under the secondary speed change shaft 11. The front wheel power transmitting mechanism 22 has a constant-speed portion S and a multiple-speed portion Q.

A constant-speed output gear S1 of the constant-speed portion S and a multiple-speed output gear Q1 of the multiple-speed portion Q are provided to the rear part of the secondary speed change shaft 11. The multiple-speed output gear Q1 also serves as a coupling for concentrically coupling a pinion shaft 37 to the rear end of the secondary speed change shaft 11.

The front wheel power output shaft 36 has a constant-speed transmitting gear S2 that meshes with the constant-speed output gear S1 of the constant-speed portion S, and a constant-speed clutch S3 for linking the constant-speed transmitting gear S2 to the front wheel power output shaft 36. Actuation of the constant-speed clutch S3 causes the power of the secondary gear-shifting shaft 11 to be transmitted as power for driving the front wheel to the front wheel power output shaft 36 at a rim speed that is the same as, or substantially equal to, the rim speed of the rear wheel. A front wheel transmission shaft 40 is connected on a front end to the front wheel power output shaft 36.

The front wheel power output shaft 36 has a multiple-speed transmission gear Q2 that meshes with the multiple-speed output gear Q1 of the multiple-speed portion Q and a multiple-speed clutch Q3 that links the multiple-speed transmission gear Q2 to the front wheel power output shaft 36. Actuating the multiple-speed clutch Q3 causes the power of the secondary speed change shaft 11 to be transmitted to the front wheel power output shaft 36 as power for driving the front wheel at a rim speed that is faster than the rim speed of the rear wheel (e.g., by 1.4 to 2 times).

The multiple-speed output gear Q1 has a larger radius than the constant-speed output gear S1, and a brake plate 38 is provided to the multiple-speed output gear Q1. The brake plate 38 constitutes an auxiliary brake, and a brake disc 39 for applying a pressure to the brake plate 38 is supported by the rear transmission casing 3R. The brake plate 38, together with means (not shown) for manually or hydraulically applying pressure to the brake plate 38 using the brake disk 39 constitutes an auxiliary brake mechanism 45 for braking the front wheel under rear wheel drive or front wheel drive.

The PTO drive shaft 26 connectably transmits power to a PTO transmission shaft 42 via a PTO clutch 41 on a rear end of the shaft 26, and drives a PTO shaft from the PTO transmission shaft 42 via a PTO speed change mechanism (not shown).

A bevel gear 43 is provided to the PTO driving shaft 26, and drives a hydraulic pump P provided to an exterior surface of the rear transmission casing 3R. The operating oil delivered from the compression oil pump P is controlled by a control valve; is supplied, via the first oil channel 16 and second oil channel 17, to the clutch pack of the speed change mechanism 4 for changing between a high and a low speed and the mechanism 6 for switching between advancing and retracting; and is supplied to the constant-speed clutch S3 and multiple-speed clutch Q3 of the front wheel power transmitting mechanism 22, to the PTO clutch 41, and to other parts.

Furthermore, the operating oil is supplied as a lubricating oil from the PTO transmission shaft 42 to the driven shaft 9; from the driven shaft 9 to the thrust shaft 3 and the speed change shaft 7; and from the thrust shaft 3 via the lubrication oil channel 18 to the counter shaft 5 through the inside of the mechanism casing 15.

In the present invention, the shapes of each of the members in the present embodiment, as well as the respective longitudinal, transverse, and vertical relationships therebetween, are ideally configured as shown in FIGS. 1 to 4. However, the embodiment is not provided by way of limitation; it is also possible to modify the members and configurations in a variety of ways, or to change the combinations thereof.

For example, it is possible to have the mechanism 6 for switching between advancing and retracting disposed in a longitudinally reversed arrangement, and the forward-rotation idler gear 10 supported using the front partition wall 13, or to have the rear end of the thrust shaft 3 supported using the middle partition wall 13A via the bearing J1, and the forward-rotation idler gear 10 supported by the thrust shaft 3 using only the bearing J2.

Alternatively, the counter shaft 5 may be supported between the high-speed driven gear 5GH and the reverse-rotation gear 6GR on the front partition wall 13B via the shaft bearing, or the forward-rotation gear 6GF and the reverse-rotation gear 6GR of the mechanism 6 for switching between advancing and retracting may be secured to the counter shaft 5, and the forward-rotation driven gear 7GF and the reverse-rotation driven gear 7GR on the speed change shaft 7 connectably configured using the advancing and retracting clutch pack.

The main speed change mechanism 8 may alternatively have three, four, or five speed-changing gears.

What is claimed is:

1. A speed change device for a traveling vehicle comprising:

a thrust shaft (3) connected to an engine (2);

a speed change mechanism (4) for changing between a high and a low speed provided to the thrust shaft (3);

a counter shaft (5) for transmitting an output from the speed change mechanism (4) for changing between a high and a low speed;

a mechanism (6) for switching between advancing and retracting provided to the counter shaft (5), the mechanism (6) having a forward-rotation idler gear (10) rotatably supported on the thrust shaft (3);

a speed change shaft (7) for transmitting reverse-rotation power from the counter shaft (5) as forward-rotation power via the forward-rotation idler gear (10);

a driven shaft (9) provided as an extension to the thrust shaft (3); and a main speed-change mechanism (8) having a driving gear group provided to the speed change shaft (7) and a driven gear group provided to the driven shaft (9).

2. The speed change device for a traveling vehicle according to claim 1, further comprising a transmission casing (13) for accommodating the mechanism (6) for switching between advancing and retracting, wherein the forward-rotation idler gear (10) is supported by a partition wall (13A) of the transmission casing (13) via a first bearing (J1), and a rear end of the thrust shaft (3) is supported by the forward-rotation idler gear (10) via a second bearing (J2).

3. The speed change device for a traveling vehicle according to claim 1, wherein:

the speed change mechanism (4) for changing between a high and a low speed is of a hydraulically switching format; and a first oil channel (16) for supplying compression oil to the speed change mechanism (4) for changing between a high and a low speed is formed in an interior of the thrust shaft (3).

4. The speed change device for a traveling vehicle according to claim 1, wherein:

the mechanism (6) for switching between advancing and retracting is of a hydraulically switching format; and a second oil channel (17) for supplying compression oil to the mechanism (6) for switching between advancing and retracting is formed in an interior of the counter shaft (5).

5. The speed change device for a traveling vehicle according to claim 1, further comprising a mechanism casing (15) for accommodating the speed change mechanism (4) for changing between a high and a low speed; and for supporting a front portion of the thrust shaft (3) and a front portion of the counter shaft (5).

6. The speed change device for a traveling vehicle according to claim 5, wherein:

a lubrication oil channel (18) is formed passing through the interior of the mechanism casing (15) from the interior of the thrust shaft (3) to the interior of the counter shaft (5).

7. The speed change device for a traveling vehicle according to claim 1, further comprising a secondary speed change shaft (11) disposed parallel to the driven shaft (9) and rearward of the counter shaft (5); and a gear group of a secondary speed change mechanism (12) provided to the secondary speed change shaft (11) and the driven shaft (9).

* * * * *